United States Patent [19]

Graneau

[11] 3,947,622
[45] Mar. 30, 1976

[54] VACUUM INSULATED A-C SUPERCONDUCTING CABLES

[75] Inventor: Peter Graneau, Concord, Mass.

[73] Assignee: Massachusetts Institute of Technology, Cambridge, Mass.

[22] Filed: Jan. 3, 1975

[21] Appl. No.: 538,430

[52] U.S. Cl. .............................. 174/15 S; 174/27
[51] Int. Cl.² ........................................ H01B 12/00
[58] Field of Search .......... 174/DIG. 6, 15 C, 15 R, 174/16 B, 27, 99 B; 333/99 S; 335/216

[56] References Cited
UNITED STATES PATENTS

| | | | |
|---|---|---|---|
| 3,343,035 | 9/1967 | Garwin ....................... | 174/15 C UX |
| 3,463,869 | 8/1969 | Cooley et al. ................... | 174/15 C |
| 3,562,401 | 2/1971 | Long ............................... | 174/27 X |
| 3,646,243 | 2/1972 | Graneau et al. ............ | 174/DIG. 6 X |
| 3,686,422 | 8/1972 | Doose ............................. | 174/27 X |
| 3,723,634 | 3/1973 | Aupoix et al. ................... | 174/27 X |
| 3,726,985 | 4/1973 | Aupoix et al. ................... | 174/27 X |
| 3,743,760 | 7/1973 | Sassin ............................. | 174/27 X |
| 3,749,811 | 7/1973 | Bogner et al. ............. | 174/DIG. 6 X |
| 3,780,205 | 12/1973 | Aupoix et al. ................... | 174/27 X |
| 3,808,351 | 4/1974 | Moisson-Frankhauser ....... | 174/27 X |

Primary Examiner—Arthur T. Grimley
Attorney, Agent, or Firm—Arthur A. Smith, Jr.; Robert Shaw; Martin M. Santa

[57] ABSTRACT

A three-phase high-voltage superconducting cable having three hollow superconductors in a trefoil configuration and three heat shields disposed radially outward from the superconductors, all enclosed in an evacuated pipe. The heat shields are also in a trefoil configuration; they are electrically isolated from one another, from the superconductors, and from ground in order to suppress the flow of induced currents. The pipe provides mechanical protection of the foregoing elements, serves as vacuum vessel and carries the a-c shielding current induced by the cable load current.

11 Claims, 4 Drawing Figures

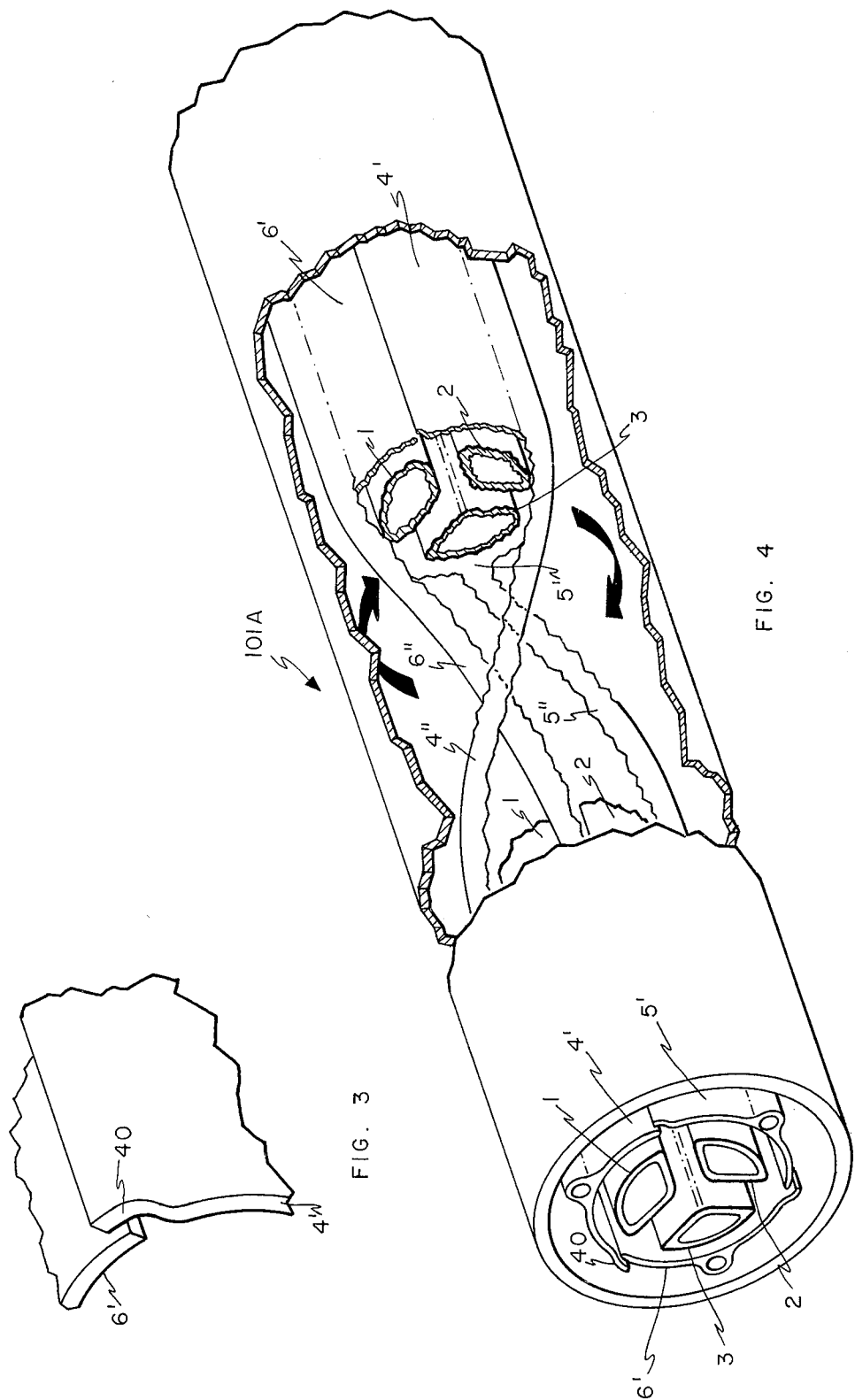

VACUUM INSULATED A-C SUPERCONDUCTING CABLES

The invention described herein was made in the course of or under a contract from the National Science Foundation, an agency of the United States Government.

The present invention relates to three-phase superconducting high voltage cables that use vacuum for electrical and thermal insulation.

Background information in connection with low-temperature power cables is contained in a journal article entitled "Three Functions of Vacuum in Cryocables," Graneau et al., *Cryogenics*, October 1972, pp. 366–369; see also "Current Distribution in the LN2 Cryo-Cable," Afshartous et al., *Cryogenics*, October, 1970, pp. 402–406. See also, U.S. Pat. Nos. 3,522,360 (Graneau et al.); 3,542,938 (Graneau); 3,549,780 (Graneau et al.); and 3,646,243 (Graneau et al.). It is sufficient for present purposes to note that a great deal of effort is currently being devoted toward developing superconducting cables capable of transmitting large blocks of polyphase power over long distances and it is an object of this invention to provide such cables.

Further objects are apparent in the description that follows and are particularly delineated in the appended claims.

The foregoing objects are achieved in a three-phase superconducting cable that has three longitudinally extending hollow superconductors in a trefoil configuration at the central portion of the cable and in a vacuum environment. Disposed radially outward from each superconductor is a conductive shield. The three shields act in combination as in infrared radiation barrier between the center of the cable and the outside environment. Both the hollow superconductors and the shields receive cryogenic fluids to effect cooling thereof. An exterior pipe acts to enclose the hollow superconductors and the shields.

The invention is hereinafter described with reference to the accompanying drawing in which:

FIG. 3 shows a modified portion of the cable in FIG. 1; and

FIG. 4 is a modified version of the cable of FIG. 1.

Figure 1:
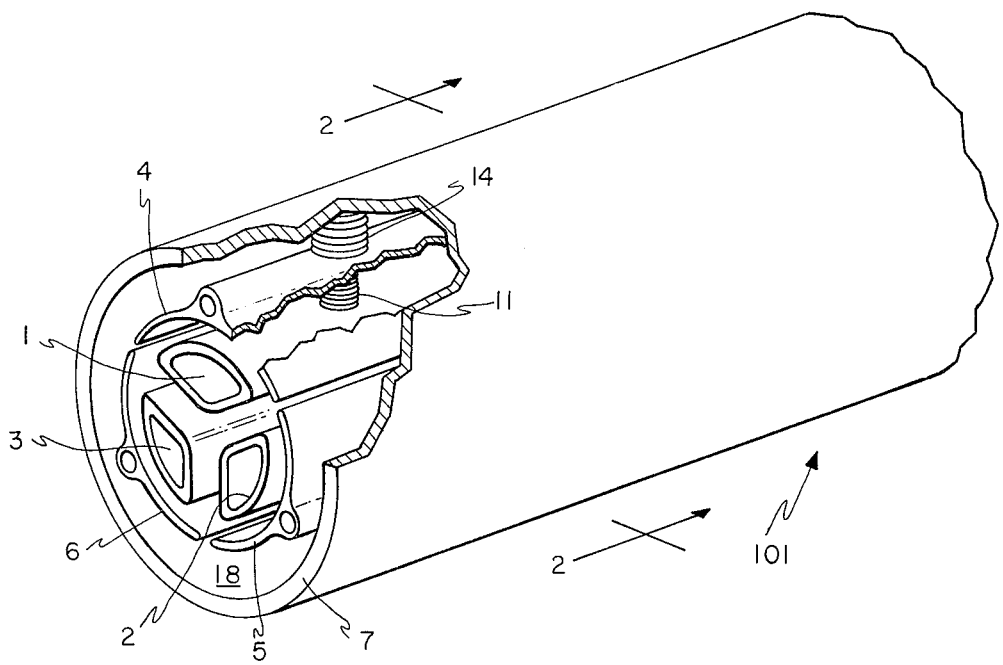
FIG. 1 is an isometric view, partly cutaway, showing a short length of cable embodying the present concepts.
Figure 2:
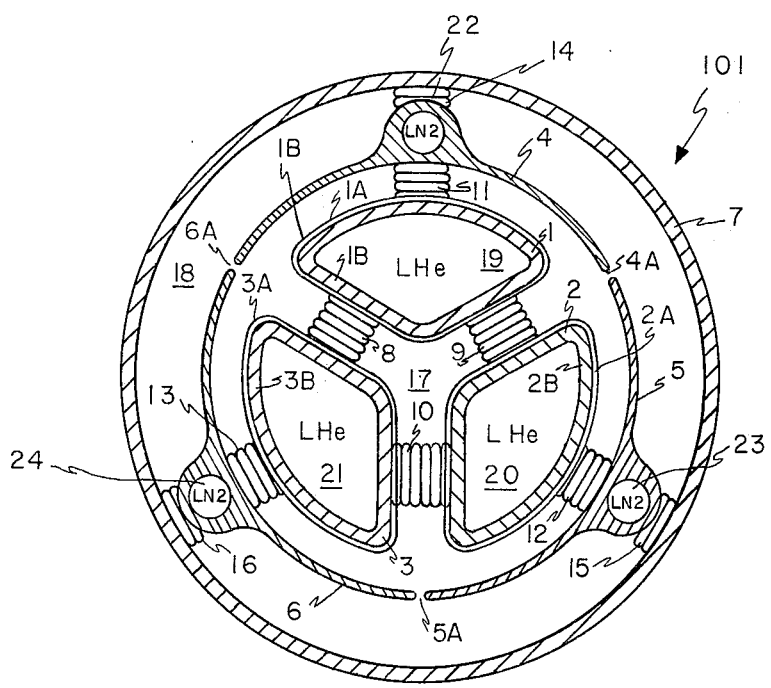
FIG. 2 is a view taken upon the line 2—2 in FIG. 1, looking in the direction of the arrows.

Turning now to FIGS. 1 and 2, there is shown at 101 a three-phase a-c superconducting high-voltage cable. The cable 101 includes three longitudinally extending superconductors 1, 2 and 3. Each may consist solidly of a superconducting material, or be a composite of one or more superconducting layers on the outside backed by a normal metal on the inside. Superconducting outer shells are labeled 1A, 2A and 3A, respectively, and the inner structural members are labeled 1B, 2B and 3B. The conductors 1, 2 and 3 are in a trefoil configuration, that is, in a place orthogonal to the cable axis, the centers of the conductor lie on a vertical circle and are separated from one another by angles of 120°, as shown.

The longitudinally extending shields 4, 5 and 6 are disposed radially outward from the superconductors so that the two groups of three elements form a nested unit in which the superconductors are contained by the three shields. The shields 4, 5 and 6 act in combination as thermal radiation reflectors for the superconductors by intercepting infrared radiation from the vacuum enclosure pipe labeled 7, which acts also as an electromagnetic shield.

The foregoing nested elements comprising the conductors 1, 2 and 3 and associated shields 4, 5 and 6, respectively, are housed within the longitudinally extending vacuum enclosure 7 disposed radially outward from the shields 4, 5 and 6 and electrically isolated therefrom. The conductors 1, 2 and 3 are are disposed in a vacuum region 17; they are mechanically interconnected at longitudinally spaced intervals along the axis by electrically insulating supports 8, 9 and 10 and are mechanically interconnected to the associated shields at longitudinally spaced intervals by further electrically insulating supports 11, 12 and 13, respectively; and the composite structure, comprising the superconductors 1 ... and the shields 4 ... which form a bundled unit, is supported within the tube 7 by electrically insulating supports 14, 15 and 16. The space labeled 18, of course, is also a vacuum space.

The hollow interiors marked 19, 20 and 21 in the superconductors 1, 2 and 3, respectively, carry liquid helium or any other cooling fluid that will maintain the superconducting state; the longitudinal channels designated 22, 23 and 24 in the shields 4, 5 and 6, respectively carry liquid nitrogen or any other cooling liquid deemed adequate for thermal shielding purposes. Both the liquid helium and the liquid nitrogen are preferably under pressure; see Kolm, U.S. Pat. No. 3,364,687. Detailed explanations on mechanisms for introducing cryogenic cooling fluids to vacuum insulated conductors can be found, for example, in said U.S. Pat. No. 3,522,360. A detailed explanation of how to handle the thermal contraction in pipes by telescopic joints can be found in said U.S. Pat. No. 3,549,780.

The structural supports members 1B, 2B and 3B are preferably extruded aluminum pipes or tubes upon which a superconducting material is bonded. The shields 4, 5 and 6 are also extruded aluminum, as is, also, the enclosure 7. The bundled unit within the pipe 7 is held in compression to simplify the design of the electrical insulators 8, 9, 10, 11, 12, 13, 14, 15 and 16.

The hollow superconductors 1 ... are separated from one another as shown for electrical insulation by the insulating supports 11 ... and the vacuum 17. Similarly, gaps 4A, 5A and 6A serve to isolate the shields from one another. However, the gaps 4A ... permit a small amount of heat radiation to reach the hollow superconductors. To prevent that from happening, the shield shown at 4' in FIG. 3 has an overlap portion 40 that extends over the adjacent shield that is designated 6'. The shield 6' and a further shield 5', see FIG. 4, have similar overlap portions.

The three-phase, a-c superconducting cable labeled 101A in FIG. 4 has most of the same features as the cable 101, except for the overlap of the shields and for transposition of the shields, as now explained. In the cable 101A at regular axial distances along the cable, the shields 4', 5' and 6' are transposed. Such transposition is effected, as noted in FIG. 4 by revolving the heat shields at the regions 4", 5" and 6" of the shields 4', 5', and 6', respectively, to change the angular position or azimuthal angle of the shields in the manner shown. Whereas the respective shields relative to the conductors 1, 2 and 3 are 4', 5', and 6' at the left part of FIG. 4, in the right part of the figure the respective shields are 6', 4', and 5'.

The need for the transpositions array arise as follows. The heat shields are immersed in the magnetic field generated by the currents in the superconductors. This field gives rise to longitudinal voltages induced in the heat shields of the same frequency as the load current and of a phase relationship determined by the current in the nearest superconductor. By way of example, the axial distance between transpositions may be twenty yards and the length of a cable considered, three hundred yards. An individual heat shield in this portion of the cable will be subjected to three longitudinally induced voltage components varying at power frequency, having equal amplitudes and the phase relationships of a normal three-phase system. Therefore the vector sum of the three components is zero. This limits the potential difference that may arise between the heat shields and the vacuum enclosure and also between heat shields and the superconductors. It therefore reduces the duty imposed on insulators 11, 12, 13, 14, 15 and 16.

Further modifications of the invention herein disclosed will occur to persons skilled in the art and all such modifications are deemed to be within the spirit and scope of the invention.

What is claimed is:

1. A three-phase a-c superconducting high-voltage cable, that comprises: three longitudinally extending hollow superconductors in a trefoil configuration cooled internally by a cryogenic fluid and in a vacuum environment; three longitudinally extending metallic heat shields disposed radially outward from the three superconductors, the heat shields being cooled by a cryogenic fluid and being electrically isolated from one another and from the hollow superconductors; and a longitudinally extending metallic vacuum enclosure disposed radially outward from the heat shields and electrically isolated therefrom and from the superconductors.

2. A three-phase a-c superconducting high-voltage cable as claimed in claim 1 in which the three superconductors are disposed in a vacuum space which separates one from the other and are mechanically secured to one another at longitudinally spaced intervals along the cable by electrically insulating supports.

3. A three-phase a-c superconducting high-voltage cable as claimed in claim 2 in which the heat shields are separated from said vacuum enclosure by a vacuum space and are mechanically connected to the vacuum enclosure at longitudinally spaced intervals along the cable by further electrically insulating supports.

4. A three-phase a-c superconducting high-voltage cable as claimed in claim 1 in which each of the hollow superconductors comprises pipe of normal metal to provide mechanical strength to contain the cryogenic fluid within, each pipe having at least one continuous superconducting material layer bonded thereto and extending the whole length of the pipe.

5. A three-phase a-c superconducting high-voltage cable as claimed in claim 4 in which each of the longitudinal heat shields is extruded aluminum having a hollow portion to contain the cryogenic fluid to cool the heat shield.

6. A three-phase a-c superconducting high-voltage cable as claimed in claim 5 in which the vacuum enclosure is a further extruded aluminum pipe.

7. A three-phase a-c superconducting high-voltage cable as claimed in claim 1 in which the inner elements within said further extruded aluminum pipe are nested, the three hollow superconductors being the innermost elements and being separated about 120° from one another in said vacuum environment, in which the heat shields are in a trefoil configuration and separated from one another by about 120°, the center of each heat shield being disposed at the same angular location as one superconductor and the heat shields being separated from one another by a vacuum space to provide electrical isolation.

8. A three-phase a-c superconducting high-voltage cable as claimed in claim 7 in which an optically overlapped arrangment of the heat shields is provided so that no direct heat radiation can reach the enclosed cold space about the three hollow superconductors.

9. A three-phase a-c superconducting high-voltage cable as claimed in claim 1 in which the superconductors are cooled by liquid helium and the shields are cooled by liquid nitrogen.

10. A three-phase a-c superconducting high-voltage cable as claimed in claim 1 in which the three superconductors and the three heat shields form a nested configuration in which the superconductors are the inner elements and the heat shields the outer elements, in which the heat shields are in a trefoil configuration, one heat shield being disposed radially outward from each superconductor, the azimuthal position of the heat shields being transposed at regular axial intervals to change the particular heat shield disposed radially outward from each superconductor.

11. A three-phase a-c superconducting high-voltage cable that comprises: three longitudinally extending superconductors in a trefoil configuration cooled internally by a cryogenic fluid and in a vacuum environment; three longitudinally extending conductive shields disposed radially outward from the three superconductors, the conductive shields being cooled by a cryogenic fluid and being electrically isolated from one another and from the superconductors; and a longitudinally extending conductive vacuum enclosure disposed radially outward from the heat shields and electrically isolated therefrom.

* * * * *